(12) United States Patent
Kamiya

(10) Patent No.: US 11,795,264 B2
(45) Date of Patent: Oct. 24, 2023

(54) LATENT CURING AGENT AND METHOD FOR MANUFACTURING SAME, COMPOSITION FOR FORMING COATING FILM, AND CATION-CURABLE COMPOSITION

(71) Applicant: DEXERIALS CORPORATION, Shimotsuke (JP)

(72) Inventor: Kazunobu Kamiya, Tokyo (JP)

(73) Assignee: DEXERIALS CORPORATION, Shimotsuke (JP)

( * ) Notice: Subject to any disclaimer, the term of this patent is extended or adjusted under 35 U.S.C. 154(b) by 177 days.

(21) Appl. No.: 17/429,984

(22) PCT Filed: Jan. 31, 2020

(86) PCT No.: PCT/JP2020/003816
§ 371 (c)(1),
(2) Date: Aug. 11, 2021

(87) PCT Pub. No.: WO2020/166398
PCT Pub. Date: Aug. 20, 2020

(65) Prior Publication Data
US 2022/0098357 A1    Mar. 31, 2022

(30) Foreign Application Priority Data
Feb. 15, 2019 (JP) ................ 2019-025573

(51) Int. Cl.
| | |
|---|---|
| C08G 18/38 | (2006.01) |
| C08G 18/76 | (2006.01) |
| C09D 175/04 | (2006.01) |
| C08G 18/08 | (2006.01) |
| C08G 18/22 | (2006.01) |
| C08G 18/30 | (2006.01) |
| C08G 18/80 | (2006.01) |
| C08G 59/70 | (2006.01) |
| C08J 3/12 | (2006.01) |
| C08K 5/5415 | (2006.01) |
| C08K 9/08 | (2006.01) |

(52) U.S. Cl.
CPC ..... *C08G 18/3893* (2013.01); *C08G 18/0866* (2013.01); *C08G 18/222* (2013.01); *C08G 18/305* (2013.01); *C08G 18/7692* (2013.01); *C08G 18/8029* (2013.01); *C08G 59/70* (2013.01); *C08J 3/126* (2013.01); *C08K 5/5415* (2013.01); *C08K 9/08* (2013.01); *C09D 175/04* (2013.01); *C08J 2375/02* (2013.01)

(58) Field of Classification Search
CPC ............ C08G 18/3893; C08G 18/7692; C08G 18/0866; C08G 18/222; C08G 18/305; C08G 18/8029; C08G 59/70; C08J 3/126; C08J 2375/02; C08K 5/5415; C08K 9/08; C09D 175/04
See application file for complete search history.

(56) References Cited

U.S. PATENT DOCUMENTS

| | | |
|---|---|---|
| 2007/0010636 A1 | 1/2007 | Kamiya et al. |
| 2008/0161589 A1 | 7/2008 | Komuro et al. |
| 2010/0324170 A1 | 12/2010 | Kamiya |
| 2017/0253694 A1 | 9/2017 | Kamiya |
| 2019/0177533 A1 | 6/2019 | Kamiya |
| 2019/0203087 A1 | 7/2019 | Kamiya |

FOREIGN PATENT DOCUMENTS

| | | |
|---|---|---|
| JP | 2000-238441 | 9/2000 |
| JP | 2007-16202 | 1/2007 |
| JP | 2009-51960 | 3/2009 |
| JP | 4381255 | 12/2009 |
| JP | 2013-177615 | 9/2013 |
| JP | 5417982 | 2/2014 |
| JP | 5481013 | 4/2014 |
| JP | 2016-56274 | 4/2016 |
| JP | 2017-222782 | 12/2017 |
| WO | 2017/217276 | 12/2017 |

OTHER PUBLICATIONS

Machine English translation of JP 2013-177615, Kansai et al., Sep. 2013.*
Machine English translation of JP 2000-238441, Kitaura et al., Sep. 2000.*
International Search Report dated Apr. 14, 2020 in PCT/JP2020/003816, with English translation, 7 pages.
Written Opinion dated Apr. 14, 2020 in PCT/JP2020/003816, with English translation, 7 pages.

* cited by examiner

*Primary Examiner* — Patrick D Niland
(74) *Attorney, Agent, or Firm* — Grüneberg and Myers PLLC

(57) ABSTRACT

Provided is a latent curing agent, including: porous particles supporting an aluminum chelate compound; and a coating film over surfaces of the porous particles, the coating film containing an aluminum chelate compound and a polymer that contains at least one of a urea bond and an urethane bond, wherein a content of an active aluminum chelate compound is 20% by mass or greater.

9 Claims, 7 Drawing Sheets

LATENT CURING AGENT AND METHOD FOR MANUFACTURING SAME, COMPOSITION FOR FORMING COATING FILM, AND CATION-CURABLE COMPOSITION

CROSS-REFERENCE TO RELATED APPLICATIONS

This application is the National Stage entry under § 371 of International Application No. PCT/JP2020/003816, filed on Jan. 31, 2020, and which claims the benefit of priority to Japanese Application No. 2019-025573, filed on Feb. 15, 2019. The content of each of these applications is hereby incorporated by reference in its entirety.

TECHNICAL FIELD

The present invention relates to a latent curing agent, a method for producing a latent curing agent, a coating film forming composition, and a cationically curable composition.

BACKGROUND ART

Hitherto, methods for producing a latent curing agent having a structure in which an aluminum chelate-based curing agent is supported by a porous resin obtained by interfacial polymerization of a multifunctional isocyanate compound have been proposed (for example, see PTLs 1 and 2).

However, because aluminum chelate-based curing agents change their compositions through reaction with water, the proposed methods have a problem that the aluminum chelate-based curing agent hydrolyzes when encapsulation of the aluminum chelate-based curing agent is performed in water through interfacial polymerization of the multifunctional isocyanate compound, to have a lowered activity.

A method for producing resin particles containing a curing agent, and a method for immersing the resin particles in an impregnation liquid containing a curing agent to increase the curing agent content in the resin particles to produce curing agent particles have been proposed (for example, see PTL 3).

However, the proposed method, which impregnates porous particles with an aluminum chelate agent taking advantage of permeability of the solvent into the porous particles, has a problem that permeability of the impregnation liquid into the particles is reduced when the concentration of the aluminum chelate agent in the impregnation liquid is increased, provided that the amount of the impregnant aluminum chelate agent depends on the concentration of the aluminum chelate agent in the impregnation liquid. Moreover, the impregnant aluminum chelate agent has a scattered state in the capsules. However, what becomes effective during epoxy curing is the aluminum chelate agent close to the outer circumference of the particles. Therefore, the amount of the aluminum chelate agent that contributes to curing is small.

An aluminum chelate-based latent curing agent that is surface-deactivated with an alkoxy silane coupling agent has been proposed (for example, see PTL 4). Through surface treatment with an alkoxy silane coupling agent, this proposal aims for realizing a good one-pack storage stability at room temperature without spoiling low-temperature curability of epoxy resin compositions. The effect of one-pack storage stability of this proposal is about 48 hours at room temperature, and greater improvement of one-pack storage stability at room temperature is demanded.

CITATION LIST

Patent Literature

PTL 1: Japanese Patent (JP-B) No. 4381255
PTL 2: JP-B No. 5417982
PTL 3: JP-B No. 5481013
PTL 4: Japanese Patent Application Laid-Open (JP-A) No. 2016-56274

SUMMARY OF INVENTION

Technical Problem

Hence, it has been demanded to provide a latent curing agent with which it is possible to obtain a cationically curable composition that can cure at a lower temperature than by existing techniques and has a significantly improved one-pack storage stability.

The present invention aims for solving the various problems in the related art and achieving the object described below. That is, the present invention has an object to provide a latent curing agent with which it is possible to obtain a cationically curable composition that can cure at a lower temperature than by existing techniques and has a significantly improved one-pack storage stability and a method for producing the same, a coating film forming composition, and a cationically curable composition.

Solution to Problem

Means for solving the above problems are as follows.
<1> A latent curing agent, including:
  porous particles supporting an aluminum chelate compound; and
  a coating film over surfaces of the porous particles, the coating film containing an aluminum chelate compound and a polymer that contains at least one of a urea bond and an urethane bond,
  wherein a content of an active aluminum chelate compound is 20% by mass or greater.
<2> The latent curing agent according to <1>,
  wherein the porous particles are formed of a polyurea resin.
<3> The latent curing agent according to <1> or <2>,
  wherein the coating film contains a nitrogen element by 5 atm % or greater.
<4> The latent curing agent according to any one of <1> to <3>,
  wherein the coating film contains an oxygen atom by 25 atm % or less.
<5> A coating film forming composition, including:
  an isocyanate compound; and
  an aluminum chelate compound,
  wherein a content of the isocyanate compound is 10% by mass or less.
<6> The coating film forming composition according to <5>,
  wherein a content of the aluminum chelate compound is 5% by mass or greater but 50% by mass or less.
<7> A method for producing a latent curing agent, the method including:

heating and stirring the coating film forming composition according to <5> or <6> and porous particles supporting an aluminum chelate compound in the presence of a non-aqueous solvent.
<8> A cationically curable composition, including:
the latent curing agent according to any one of <1> to <4>; and
a cationically curable compound.
<9> The cationically curable composition according to <8>, wherein the cationically curable compound is an epoxy compound or an oxetane compound.
<10> The cationically curable resin composition according to <8> or <9>, further including:
an aryl silanol compound.

Advantageous Effects of Invention

The present invention can solve the various problem in the related art, achieve the object described above, and provide a latent curing agent with which it is possible to obtain a cationically curable composition that can cure at a lower temperature than by existing techniques and has a significantly improved one-pack storage stability and a method for producing the same, a coating film forming composition, and a cationically curable composition.

Figure 1:
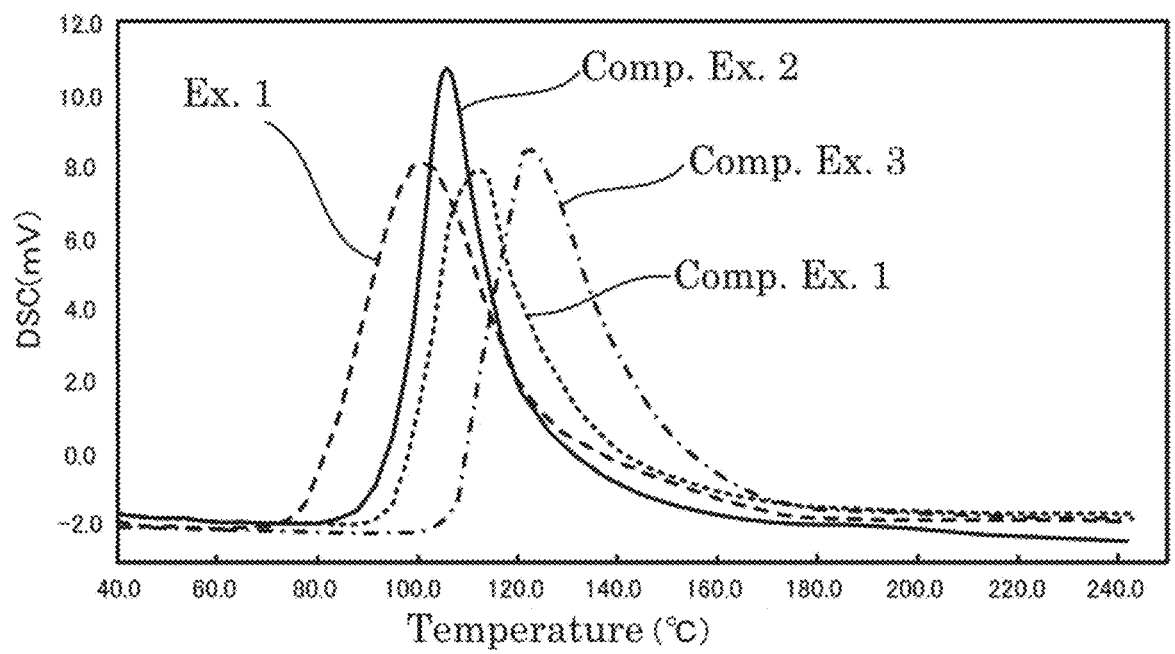
FIG. 1 is a chart indicating the result of DSC measurement of latent curing agents of Example 1, Comparative Example 1, Comparative Example 2, and Comparative Example 3.

DESCRIPTION OF EMBODIMENTS (Latent Curing Agent)
A latent curing agent of the present invention contains porous particles supporting an aluminum chelate compound, and a coating film over the surfaces of the porous particles, the coating film containing an aluminum chelate compound and a polymer that contains at least one of a urea bond and a urethane bond, and further contains other components as needed.

The content of an active aluminum chelate compound in the latent curing agent is 20% by mass or greater, preferably 25% by mass or greater, and more preferably 30% by mass or greater. The upper limit of the content of the active aluminum chelate compound needs to be 80% by mass or less at the maximum and may be 60% by mass or less when the amount of the polymer that contains at least one of a urea bond and a urethane bond is taken into consideration.

When the content of the active aluminum chelate compound is 20% by mass or greater, it is possible to obtain a higher curing activity than hitherto obtained.

Here, an active aluminum chelate compound means an aluminum chelate compound that does not hydrolyze but maintains the initial structure in the latent curing agent.

The content of the active aluminum chelate compound in the latent curing agent can be measured by, for example, a LC/MS (Liquid Chromatography Mass Spectrometry) method.

It is possible to confirm that the coating film contains a polymer that contains at least one of a urea bond and a urethane boned, by presence of a urea bond-containing polymer in the coating film, corroborated by presence of a peak at a wavenumber of from 1,710 cm$^{-1}$ through 1,730 cm$^{-1}$ in an infrared absorption (IR) analysis.

<Porous Particles>
The porous particles support an aluminum chelate compound.
The porous particles are formed of a polyurea resin.
The porous particles support the aluminum chelate compound in, for example, the cells thereof. In other words, the aluminum chelate compound is absorbed into and supported in the minute pores present in the porous particle matrix formed of the polyurea resin.
<<Polyurea Resin>>
The polyurea resin is a resin that contains a urea bond in the resin.
The polyurea resin constituting the porous particles is obtained by, for example, polymerization of a multifunctional isocyanate compound in an emulsified liquid. The detail will be described below. The polyurea resin may contain a bond that is derived from an isocyanate group and is other than a urea bond, such as a urethane bond. When the polyurea resin contains a urethane bond, it may be referred to as polyurea-urethane resin.
<<Aluminum Chelate Compound>>
Examples of the aluminum chelate compound include a complex compound, which, as represented by General formula (1) below, is aluminum to which three β-ketoenolate anions are coordinated. Here, the alkoxy groups are not directly bonded to aluminum, because if the alkoxy groups are directly bonded, the aluminum chelate compound easily hydrolyzes and is unsuitable for an emulsification process.

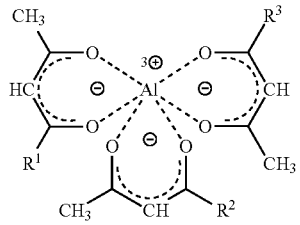

General formula (1)

In General formula (1), $R^1$, $R^2$, and $R^3$ each independently represent an alkyl group or an alkoxy group.

Examples of the alkyl group include a methyl group and an ethyl group.

Examples of the alkoxy group include a methoxy group, an ethoxy group, and an oleyloxy group.

Examples of the complex compound represented by General formula (1) above include aluminum tris(acetyl acetonate), aluminum tris(ethyl acetoacetate), aluminum monoacetyl acetonate bis(ethyl acetoacetate), and aluminum monoacetyl acetonate bis(oleyl acetoacetate).

The content of the aluminum chelate compound in the porous particles is not particularly limited and may be appropriately selected depending on the intended purpose.

The average pore diameter of the pores of the porous particles is not particularly limited, may be appropriately selected depending on the intended purpose, and is preferably 1 nm or greater but 300 nm or less and more preferably 5 nm or greater but 150 nm or less.

<Coating Film>

The coating film contains an aluminum chelate compound, and a polymer that contains at least one of a urea bond and a urethane bond. That is, the coating film is a polymeric coating film containing an aluminum chelate compound. The aluminum chelate compound may be bonded in the coating film by arbitrary chemical bonding such as coordination bonding, covalent bonding, and hydrogen bonding, or may be supported in the coating film by arbitrary interaction such as attachment, adhesion, adsorption, and van der Waals binding.

The coating film is formed over the surfaces of the porous particles, and needs only to be formed over at least part of the surfaces of the porous particles but may be formed in a manner to coat the entire surfaces of the porous particles. The coating film may be formed as a continuous film or may include a discontinuous film.

The coating film contains the nitrogen element preferably by 5 atm % or greater and more preferably by 6 atm % or greater.

The coating film contains the oxygen element preferably by 25 atm % or less and more preferably by 21 atm % or less.

With the coating film containing the nitrogen element by 5 atm % or greater and the oxygen element by 25 atm % or greater, it is possible to confirm formation, over the surfaces of the porous particles, of the coating film of the present invention containing the aluminum chelate compound, and the polymer that contains at least one of a urea bond and a urethane bond.

The nitrogen element and the oxygen element in the coating film can be measured by, for example, Electron Spectroscopy for Chemical Analysis (ESCA).

The porous particles par se function as a latent curing agent having a low-temperature curing ability. However, when the porous particles are used as a latent curing agent in a cationically curable composition, the one-pack storage stability of the cationically curable composition is not satisfactory enough. Particularly, when an alicyclic epoxy resin having an excellent cationic polymerizability is used as the cationically curable composition, the one-pack storage stability thereof is insufficient.

On the other hand, the latent curing agent of the present invention having the coating film containing the aluminum chelate compound and the polymer that contains at least one of a urea bond and a urethane bond over the surfaces of the porous particles enables curing at a lower temperature than by existing techniques, and when used in a cationically curable composition, significantly improves the one-pack storage stability of the cationically curable composition.

That is, the latent curing agent of the present invention can contain a highly active aluminum chelate compound in the polymeric coating film that is formed over the surfaces of the porous particles in a coating step by a solvent-based treatment. Moreover, by performing the coating process at a low temperature, it is possible to impart a low glass transition temperature (Tg) to the polymeric coating film to be formed, making it possible to prepare a latent curing agent that exhibits thermal responsiveness at a lower temperature.

As a result, the highly active site of the coating film over the surfaces of the porous particles mainly functions as a region that contributes to curing. This makes it possible to increase the low-temperature curing activity and prepare a cationically curable composition having a highly excellent one-pack storage stability at room temperature.

It is preferable that the latent curing agent have a particulate shape.

The volume average particle diameter of the latent curing agent is not particularly limited, may be appropriately selected depending on the intended purpose, and is preferably 0.5 micrometers or greater but 20 micrometers or less, more preferably 1 micrometer or greater but 10 micrometers or less, and particularly preferably 1 micrometer or greater but 5 micrometers or less.

(Method for Producing Latent Curing Agent)

The method for producing a latent curing agent includes a porous particle producing step and a coating step, and further includes other steps as needed.

<Porous Particle Producing Step>

The porous particle producing step includes at least an emulsified liquid producing process and a polymerization process, preferably includes an additionally filling process, and further includes other processes as needed.

<<Emulsified Liquid Producing Process>>

The emulsified liquid producing process is not particularly limited and may be appropriately selected depending on the intended purpose so long as the emulsified liquid producing process is a process of emulsifying a liquid obtained by mixing an aluminum chelate compound and a multifunctional isocyanate compound, and preferably an organic solvent, to thereby obtain an emulsified liquid. The emulsified liquid producing process can be performed with, for example, a homogenizer.

Examples of the aluminum chelate compound include the aluminum chelate compound descried in the description about the latent curing agent of the present invention.

The size of oil droplets in the emulsified liquid is not particularly limited, may be appropriately selected depending on the intended purpose, and is preferably 0.5 micrometers or greater but 100 micrometers or less.

—Multifunctional Isocyanate Compound—

The multifunctional isocyanate compound is a compound that contains two or more isocyanate groups, preferably three isocyanate groups in one molecule. More preferable examples of such a trifunctional isocyanate compound include a TMP adduct form represented by General formula (2) below, obtained by allowing 1 mole of trimethylolpropane and 3 moles of a diisocyanate compound to undergo reaction, an isocyanurate form represented by General formula (3) below, obtained by allowing 3 moles of a diisocyanate compound to undergo self-condensation, and a biuret form represented by General formula (4) below, obtained as a result of diisocyanate urea obtained from 2 moles out of 3 moles of a diisocyanate compound undergoing condensation with the remaining 1 mole of diisocyanate.

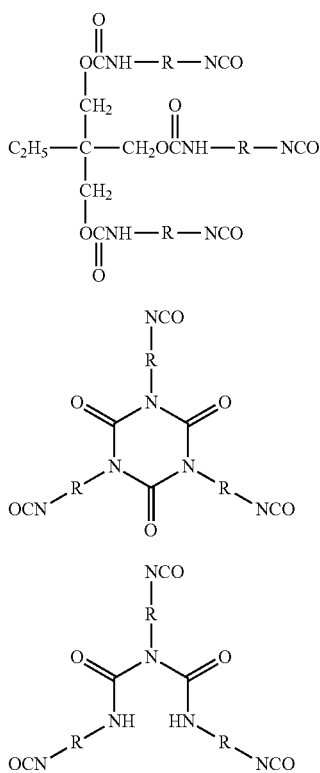

General formula (2)

General formula (3)

General formula (4)

In general formulae (2) to (4), a substituent R is a moiety of the diisocyanate compound except an isocyanate group. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylene diphenyl-4,4'-diisocyanate.

The mix proportion between the aluminum chelate compound and the multifunctional isocyanate compound is not particularly limited and may be appropriately selected depending on the intended purpose. When the amount of the aluminum chelate to be mixed is extremely low, a curing ability for a cationically curable compound to be cured is low. When the amount of the aluminum chelate to be mixed is extremely high, the latency of the latent curing agent to be obtained is low. In these regards, the ratio of the aluminum chelate with respect to 100 parts by mass of the multifunctional isocyanate compound is preferably 10 parts by mass or greater but 500 parts by mass or less and more preferably 10 parts by mass or greater but 300 parts by mass or less.

—Organic Solvent—

The organic solvent is not particularly limited and may be appropriately selected depending on the intended purpose. A volatile organic solvent is preferable.

It is preferable that the organic solvent be a good solvent for each of the aluminum chelate compound and the multifunctional isocyanate compound (each having a solubility of preferably 0.1 g/ml (organic solvent) or greater), be substantially insoluble to water (water having a solubility of 0.5 g/ml (organic solvent) or less), and have a boiling point of 100 degrees C. or lower at the atmospheric pressure. Specific examples of such a volatile organic solvent include alcohols, acetic acid esters, and ketones. Among these volatile organic solvents, ethyl acetate is preferable in terms of a high polarity, a low boiling point, and a poor water-solubility.

The amount of the organic solvent to be used is not particularly limited and may be appropriately selected depending on the intended purpose.

<<Polymerization Process>>

The polymerization process is not particularly limited and may be appropriately selected depending on the intended purpose so long as the polymerization process is a process of polymerizing the multifunctional isocyanate compound in the emulsified liquid to obtain porous particles.

The porous particles support the aluminum chelate compound.

In the polymerization process, some isocyanate groups of the multifunctional isocyanate compound are hydrolyzed to amino groups, and these amino groups react with isocyanate groups of the multifunctional isocyanate compound to produce urea bonds, to obtain a polyurea resin. Here, when the multifunctional isocyanate compound contains a urethane bond, the polyurea resin to be obtained also contains a urethane bond. In this regard, the polyurea resin to be produced can also be referred to as polyurea urethane resin.

The polymerization time in the polymerization process is not particularly limited, may be appropriately selected depending on the intended purpose, and is preferably 1 hour or longer but 30 hours or shorter and more preferably 2 hours or longer but 10 hours or shorter.

The polymerization temperature in the polymerization process is not particularly limited, may be appropriately selected depending on the intended purpose, and is preferably 30 degrees C. or higher but 90 degrees C. or lower and more preferably 50 degrees C. or higher but 80 degrees C. or lower.

After the polymerization process, it is possible to perform an additionally filling process in order to increase the amount of the aluminum chelate compound to be supported by the porous particles.

<<Additionally Filling Process>>

The additionally filling process is not particularly limited and may be appropriately selected depending on the intended purpose so long as the additionally filling process is a process of additionally filling an aluminum chelate compound to the porous particles obtained through the polymerization process. Examples of the method for the additionally filling process include a method of immersing the porous particles in a solution obtained by dissolving an aluminum chelate compound in an organic solvent and subsequently removing the organic solvent from the solution.

Through the additionally filling process, the amount of the aluminum chelate compound to be supported by the porous particles increases. The porous particles to which the aluminum chelate compound is additionally filled may be filtrated, washed, and dried as needed, and subsequently pulverized to primary particles with a known pulverizer.

The aluminum chelate compound to be additionally filled in the additionally filling process may be the same as or different from the aluminum chelate compound mixed in the liquid, which is to become the emulsified liquid. For example, because no water is used in the additionally filling process, the aluminum chelate compound used in the additionally filling process may be an aluminum chelate compound in which alkoxy groups are bonded to aluminum. Examples of such an aluminum chelate compound include diisopropoxyaluminum monooleyl acetoacetate, monoisopropoxyaluminum bis(oleyl acetoacetate), monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and monoisopropoxyaluminum mono-N-lauroyl-β-alanate monolauryl acetoacetate.

The organic solvent is not particularly limited and may be appropriately selected depending on the intended purpose. Examples of the organic solvent include the organic solvents raised as examples in the description about the emulsified liquid producing process. A preferable mode is also the same.

The method for removing the organic solvent from the solution is not particularly limited and may be appropriately selected depending on the intended purpose. Examples of the method include a method of heating the solution to higher than or equal to the boiling point of the organic solvent and a method of depressurizing the solution.

The content of the aluminum chelate compound in the solution obtained by dissolving the aluminum chelate compound in the organic solvent is not particularly limited, may be appropriately selected depending on the intended purpose, and is preferably 10% by mass or greater but 80% by mass or less and more preferably 10% by mass or greater but 50% by mass or less.

<Coating Step>

The coating step is a step of coating the surfaces of the porous particles supporting the aluminum chelate compound with a coating film forming composition.

Through the coating step, a coating film containing a highly active aluminum chelate compound can be formed over the surfaces of the porous particles.

The coating film forming composition contains an isocyanate compound and an aluminum chelate compound, preferably contains an organic solvent, and further contains other components as needed.

The isocyanate compound is not particularly limited and may be appropriately selected depending on the intended purpose. Examples of the isocyanate compound include the multifunctional isocyanate compounds raised as examples in the production of the porous particles.

The content of the isocyanate compound is preferably 10% by mass or less and more preferably 5% by mass or less. When the content of the isocyanate compound is 10% by mass or less, it is possible to maintain the coating film forming composition in its liquid state almost throughout the coating process and perform a suitable coating process.

Because no water is used in the coating step, the aluminum chelate compound contained in the coating film forming composition may be an aluminum chelate compound in which alkoxy groups are bonded to aluminum. Examples of such an aluminum chelate compound include diisopropoxyaluminum monooleyl acetoacetate, monoisopropoxyaluminum bis(oleyl acetoacetate), monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and monoisopropoxyaluminum mono-N-lauroyl-6-alanate monolauryl acetoacetate.

The content of the aluminum chelate compound is preferably 5% by mass or greater but 50% by mass or less and more preferably 20% by mass or greater but 40% by mass or less.

The organic solvent is not particularly limited and may be appropriately selected depending on the intended purpose. Examples of the organic solvent include the organic solvents raised as examples in the production of the porous particles.

The porous particles supporting the aluminum chelate compound are immersed in the coating film forming composition, and heated and stirred in the presence of a nonaqueous solvent. Because the coating step is a solvent-based process, the coating film over the surfaces of the porous particles can contain the aluminum chelate compound in a highly active state.

Here, it is known that an isocyanate compound is coordinated to a metal complex, and the obtained coordination compound is applied as a catalyst for production of urethane resins (see D. K. Chattopadhyay, K. VS. N. Raju, Progress in Polymer Science, 32, 352-418 (2007) Janis Robins Journal of Applied Polymer Science, 9, 821-838 (1965)).

By the catalytic action of the coordination compound, the isocyanate compound in the coating film forming composition is gradually polymerized over time. Here, by stirring the coating film forming composition at a constant stirring speed, it is possible to form a polymeric coating film over the surfaces of the porous particles in the coating film forming composition. Because the highly active aluminum chelate compound is dissolved in the coating film forming composition together with the isocyanate compound, a polymeric coating film containing the highly active aluminum chelate compound is formed over the surfaces of the porous particles.

The temperature of the coating film forming composition in the coating step is not particularly limited, may be appropriately selected depending on the intended purpose, and is preferably 20 degrees C. or higher but 60 degrees C. or lower and more preferably 20 degrees C. or higher but 40 degrees C. or lower in terms of preventing aggregation of the porous particles and outflow of the aluminum chelate compound from the porous particles.

The immersion time in the coating step is not particularly limited, may be appropriately selected depending on the intended purpose, and is preferably 2 hours or longer but 48 hours or shorter and more preferably 5 hours or longer but 30 hours or shorter. During the immersion, the coating film forming composition in which the porous particles are immersed is stirred at a constant stirring speed (e.g., from 100 rpm through 500 rpm).

The latent curing agent obtained through the coating step may be filtrated, washed with an organic solvent, and dried as needed, and subsequently pulverized to primary particles with a known pulverizer.

The organic solvent used for the washing is not particularly limited, may be appropriately selected depending on the intended purpose, and is preferably a nonpolar solvent. Examples of the nonpolar solvent include hydrocarbon-based solvents. Examples of the hydrocarbon-based solvents include toluene, xylene, and cyclohexane.

(Cationically Curable Composition)

The cationically curable composition of the present invention contains the latent curing agent of the present invention and a cationically curable compound, preferably contains an aryl silanol compound, and further contains other components as needed.

<Latent Curing Agent>

The latent curing agent contained in the cationically curable composition is the latent curing agent of the present invention.

The content of the latent curing agent in the cationically curable composition is not particularly limited, may be appropriately selected depending on the intended purpose, and is preferably 1 part by mass or greater but 70 parts by mass or less and more preferably 1 part by mass or greater but 50 parts by mass or less relative to 100 parts by mass of the cationically curable compound. When the content of the latent curing agent is less than 1 part by mass, curability may degrade. When the content of the latent curing agent is greater than 70 parts by mass, resin properties (e.g., flexibility) of a cured product may degrade.

<Cationically Curable Compound>

The cationically curable compound is not particularly limited and may be appropriately selected depending on the intended purpose so long as the cationically curable compound is an organic material having cationic curability. Examples of the cationically curable compound include epoxy compounds, oxetane compounds, and vinyl ether compounds. Among these cationically curable compounds, epoxy compounds and oxetane compounds are preferable.

<<Epoxy Compound>>

The epoxy compound is not particularly limited and may be appropriately selected depending on the intended purpose. Examples of the epoxy compound include alicyclic epoxy resins and glycidyl ether-type epoxy resins.

The alicyclic epoxy resin is not particularly limited and may be appropriately selected depending on the intended purpose. Examples of the alicyclic epoxy resin include vinyl cyclopentadiene dioxide, vinyl cyclohexene mono- or di-oxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro [5.5] undecan-3-yl]-cyclohexane), 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctane carboxylate), and bis($C_{1-3}$ alkylepoxy $C_{5-12}$ cycloalkyl $C_{1-3}$ alkyl)dicarboxylate (e.g., bis(2-methyl-3,4-epoxycyclohexylmethyl)adipate). One of these alicyclic epoxy resins may be used alone or two or more of these alicyclic epoxy resins may be used in combination.

As the alicyclic epoxy resin, 3,4-epoxycyclohexylmethyl-3',4'-epoxycyclohexane carboxylate [available from Daicel Corporation, product name: CELLOXIDE #2021P; with an epoxy equivalent of from 128 through 140] is suitable for use in terms of ease of procurement as a commercially available product.

In the listing of examples above, the descriptions $C_{8-15}$, $C_{5-12}$, and $C_{1-3}$ stand for a number of carbon atoms of from 8 through 15, a number of carbon atoms of from 5 through 12, and a number of carbon atoms of from 1 through 3, respectively, and suggest structural variations of the compounds.

The structural formula of an example of the alicyclic epoxy resin is presented below.

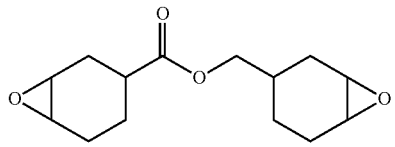 [SMILES: O=C(OCC1CCC2OC2C1)C1CCC2OC2C1]

The glycidyl ether-type epoxy resin may be, for example, a liquid or a solid typically has an epoxy equivalent of about from 100 through 4,000, and preferably contains two or more epoxy groups in a molecule thereof. Examples of the glycidyl ether-type epoxy resin include bisphenol A-type epoxy resins, bisphenol F-type epoxy resins, phenol novolac-type epoxy resins, cresol novolac-type epoxy resins, and ester-type epoxy resins. One of these glycidyl ether-type epoxy resins may be used alone or two or more of these glycidyl ether-type epoxy resins may be used in combination. Among these glycidyl ether-type epoxy resins, bisphenol A-type epoxy resins are suitable for use in terms of resin properties. These epoxy resins encompass monomers and oligomers.

<<Oxetane Compound>>

Combined use of the oxetane compound with the epoxy resin in the cationically curable composition enables a sharp exothermic peak.

Examples of the oxetane compound include 3-ethyl-3-hydroxymethyl oxetane, 3-ethyl-3-{[(3-ethyloxetan-3-yl)methoxy]methyl}oxetane, 1,4-bis{[(3-ethyl-3-oxetanyl)methoxy]methyl}benzene, 4,4'-bis[(3-ethyl-3-oxetanyl)methoxymethyl]biphenyl, 1,4-benzene dicarboxylic acid bis[(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)]methyl ether, 3-ethyl-3-{[3-(triethoxysilyl)propoxy]methyl}oxetane, oxetanyl silsesquioxane, and phenol novolac oxetane. One of these oxetane compounds may be used alone or two or more of these oxetane compounds may be used in combination.

The content of the cationically curable compound in the cationically curable composition is not particularly limited, may be appropriately selected depending on the intended purpose, and is preferably 30% by mass or greater but 99% by mass or less, more preferably 50% by mass or greater but 98% by mass or less, and particularly preferably 70% by mass or greater but 97% by mass or less.

The content is a content in the nonvolatile components of the cationically curable composition. The same applies hereinafter.

The content of the epoxy resin in the cationically curable compound is not particularly limited, may be appropriately selected depending on the intended purpose, and may be, for example, 80% by mass or greater or may be 90% by mass or greater.

The content of the oxetane compound in the cationically curable compound is not particularly limited, may be appropriately selected depending on the intended purpose, and may be, for example, greater than 0% by mass but 20% by mass or less, may be 15% by mass or less, and may be 10% by mass or less.

<Aryl Silanol Compound>

The aryl silanol compound is represented by, for example, General formula (A) below.

$(Ar)_m Si(OH)_n$         General formula (A)

In General formula (A), m is 2 or 3 and is preferably 3, the sum of m and n is 4, and Ar is an aryl group that may contain a substituent.

The aryl silanol compound represented by General formula (A) is a monool form or a diol form.

In General formula (A), Ar is an aryl group that may contain a substituent.

Examples of the aryl group include a phenyl group, a naphthyl group (e.g., a 1-naphthyl group and a 2-naphthyl group), an anthracenyl group (e.g., a 1-anthracenyl group, a 2-anthracenyl group, a 9-anthracenyl group, and a benz[a]-9-anthracenyl group), a phenaryl group (e.g., a 3-phenaryl group and a 9-phenaryl group), a pyrenyl group (e.g., a 1-pyrenyl group), an azulenyl group, a fluorenyl group, a biphenyl group (e.g., a 2-biphenyl group, a 3-biphenyl group, and a 4-biphenyl group), a thienyl group, a furyl group, a pyrrolyl group, an imidazolyl group, and a pyridyl group. One of these aryl groups may be used alone or two or more of these aryl groups may be used in combination. Among these aryl groups, a phenyl group is preferable in terms of ease of procurement and costs for procurement. The m number of Ar may be the same as or different from each other, but preferably are the same as each other in terms of ease of procurement.

For examples, these aryl groups may contain one through three substituents.

Examples of the substituent include an electron withdrawing group and an electron donating group.

Examples of the electron withdrawing group include a halogen group (e.g., a chloro group and a bromo group), a trifluoromethyl group, a nitro group, a sulfo group, a carboxyl group, an alkoxycarbonyl group (e.g. a methoxycarbonyl group and an ethoxycarbonyl group), and a formyl group.

Examples of the electron donating group include an alkyl group (e.g., a methyl group and a propyl group), an alkoxy group (e.g., a methoxy group and an ethoxy group), a hydroxy group, an amino group, a monoalkyl amino group (e.g., a monomethyl amino group), a dialkyl amino group (e.g., a dimethyl amino group).

Specific examples of a phenyl group containing a substituent include a 2-methylphenyl group, a 3-methylphenyl group, a 4-methylphenyl group, a 2,6-dimethylphenyl group, a 3,5-dimethylphenyl group, a 2,4-dimethylphenyl group, a 2,3-diemthylphenyl group, a 2,5-dimethylphenyl group, a 3,4-dimethylphenyl group, a 2,4,6-trimethylphenyl group, a 2-ethylphenyl group, and a 4-ethylphenyl group.

Use of an electron withdrawing group as a substituent makes it possible to increase the acidity of a hydroxyl group of a silanol group. Use of an electron donating group as a substituent makes it possible to decrease the acidity of a hydroxyl group of a silanol group. Therefore, with the substituent, it is possible to control the curing activity.

Here, the m number of Ar may contain different substituents, but preferably contain the same substituent in terms of ease of procurement of the m number of Ar. Moreover, some Ar may contain a substituent and the other Ar need not contain a substituent.

Among these, triphenyl silanol and diphenyl silanediol are preferable, and triphenyl silanol is particularly preferable.

<Other Components>

The other components are not particularly limited and may be appropriately selected depending on the intended purpose. Examples of the other components include a silane coupling agent, a filler, a pigment, and an antistat.

<<Silane Coupling Agent>>

As described in paragraphs [0007] to [0010] of Japanese Patent Application Laid-Open (JP-A) No. 2002-212537, the silane coupling agent has a function of cooperating with an aluminum chelate agent to initiate cationic polymerization of a thermosetting resin (e.g., a thermosetting epoxy resin). Hence, combined use of such a silane coupling agent in a small amount can provide an effect of promoting curing of an epoxy resin. Such a silane coupling agent contains one through three lower alkoxy groups in a molecule, and may contain a group having reactivity with a functional group of a thermosetting resin in a molecule, such as a vinyl group, a styryl group, an acryloyloxy group, a methacryloyloxy group, an epoxy group, an amino group, and a mercapto group. Because the latent curing agent of the present invention is a cationic curing agent, a coupling agent containing an amino group or a mercapto group may be used so long as the amino group or the mercapto group does not substantially trap cationic species generated.

Examples of the silane coupling agent include vinyl tris(8-methoxyethoxy)silane, vinyl triethoxysilane, vinyl trimethoxysilane, γ-styryl trimethoxysilane, γ-methacryloxypropyl trimethoxysilane, γ-acryloxypropyl trimethoxysilane, β-(3,4-epoxycyclohexyl)ethyl trimethoxysilane, γ-glycidoxypropyl trimethoxysilane, γ-glycidoxypropyl methyl diethoxysilane, N-β-(aminoethyl)-γ-aminopropyl trimethoxysilane, N-β-(aminoethyl)-γ-aminopropyl methyl dimethoxysilane, γ-aminopropyl triethoxysilane, N-phenyl-γ-aminopropyl trimethoxysilane, γ-mercaptopropyl trimethoxysilane, and γ-chloropropyl trimethoxysilane. One of these silane coupling agents may be used alone or two or more of these silane coupling agents may be used in combination.

The content of the silane coupling agent in the cationically curable composition is not particularly limited, may be appropriately selected depending on the intended purpose, and is preferably 1 part by mass or greater but 300 parts by mass or less and more preferably 1 part by mass or greater but 100 parts by mass or less relative to 100 parts by mass of the latent cuing agent.

The cationically curable composition of the present invention can be cured at a lower temperature than by existing techniques, has a significantly improved one-pack storage stability, and has a high convenience. Therefore, the cationically curable composition of the present invention can be suitably used in various fields widely.

EXAMPLES

The present invention will be described below by way of Examples. However, the present invention should not be construed as being limited to these examples.

Coating Film Forming Composition Preparation Example 1

—Preparation of Coating Film Forming Composition 1—

An aluminum chelate agent (ALUMICHELATE D, obtained from Kawaken Fine Chemicals Co., Ltd.) (12.5 parts by mass), another aluminum chelate agent (ALCH-TR, aluminum tris(ethyl acetoacetate), obtained from Kawaken Fine Chemicals, Co., Ltd.) (25 parts by mass), ethyl acetate (57.5 parts by mass), and a trimethylolpropane (1 mole) adduct of methylene diphenyl-4,4'-diisocyanate (3 moles) (a multifunctional isocyanate compound, D-109, obtained from Mitsui Chemicals, Inc.) (5 parts by mass) were fed and stirred at 30 degrees C. for 20 hours at a stirring speed of 200 rpm, to prepare a coating film forming composition 1.

Coating Film Forming Composition Preparation Example 2

—Preparation of Coating Film Forming Composition 2—

An aluminum chelate agent (ALUMICHELATE D, obtained from Kawaken Fine Chemicals Co., Ltd.) (12.5 parts by mass), another aluminum chelate agent (ALCH-TR, obtained from Kawaken Fine Chemicals, Co., Ltd.) (25 parts by mass), ethyl acetate (52.5 parts by mass), and a trimethylolpropane (1 mole) adduct of methylene diphenyl-4,4'-diisocyanate (3 moles) (a multifunctional isocyanate compound, D-109, obtained from Mitsui Chemicals, Inc.) (10 parts by mass) were fed and stirred at 30 degrees C. for 20 hours at a stirring speed of 200 rpm, to prepare a coating film forming composition 2.

Coating Film Forming Composition Preparation Example 3

—Preparation of Coating Film Forming Composition 3—

An aluminum chelate agent (ALUMICHELATE D, obtained from Kawaken Fine Chemicals Co., Ltd.) (12.5 parts by mass), another aluminum chelate agent (ALCH-TR, obtained from Kawaken Fine Chemicals, Co., Ltd.) (25 parts by mass), ethyl acetate (47.5 parts by mass), and a trimethylolpropane (1 mole) adduct of methylene diphenyl-4,4'-diisocyanate (3 moles) (a multifunctional isocyanate compound, D-109, obtained from Mitsui Chemicals, Inc.) (15 parts by mass) were fed and stirred at 30 degrees C. for 20 hours at a stirring speed of 200 rpm, to Prepare a Coating Film Forming Composition 3.

<State of Coating Film Forming Composition>

Next, the prepared coating film forming compositions 1 to 3 were visually observed to evaluate the state of the coating film forming compositions. The results are presented in Table 1.

TABLE 1

| | Content of isocyanate compound (% by mass) | Content of aluminum chelate compound (% by mass) | Content of ethyl acetate (% by mass) | State of coating film forming composition |
|---|---|---|---|---|
| Preparation Ex. 1 | 5 | 37.5 | 57.5 | Liquid |
| Preparation Ex. 2 | 10 | 37.5 | 52.5 | Partially solid, with fluidity |
| Preparation Ex. 3 | 15 | 37.5 | 47.5 | Mostly solid, with no fluidity |

From the results of Table 1, it is seen that when the content of the isocyanate compound in the coating film forming composition was 5% by mass, the coating film forming composition was liquid, whereas that when the content of the isocyanate compound in the coating film forming composition was 10% by mass, the coating film forming composition partially precipitated as a solid but maintained fluidity, and was of a non-problematic level for practical use.

It was found that when the content of the isocyanate compound in the coating film forming composition was 15% by mass, the reacting amount of the isocyanate compound in the coating film forming composition was high, and most of the coating film forming composition precipitated as a solid to lose fluidity.

Hence, it was found necessary to set the content of the isocyanate compound to 10% by mass or less in order to maintain the fluidity of the forming film forming composition during the coating process.

Example 1

<Production of Latent Curing Agent 1>
<<Porous Particle Producing Step>>
—Preparation of Aqueous Phase—

Distilled water (800 parts by mass), a surfactant (NEWREX R-T, obtained from NOF Corporation) (0.05 parts by mass), polyvinyl alcohol (PVA-205, obtained from Kuraray Co., Ltd.) (4 parts by mass) serving as a dispersant were put in a 3-liter interfacial polymerization vessel equipped with a thermometer, and mixed uniformly, to prepare an aqueous phase.

—Preparation of Oil Phase—

Next, a 24% by mass solution of aluminum monoacetyl acetonate bis(ethyl acetoacetate) in isopropanol (ALUMICHELATE D, obtained from Kawaken Fine Chemicals Co., Ltd.) (100 parts by mass), and a trimethylolpropane (1 mole) adduct of methylene diphenyl-4,4'-diisocyanate (3 moles) (a multifunctional isocyanate compound, D-109, obtained from Mitsui Chemicals, Inc.) (70 parts by mass) were dissolved in ethyl acetate (130 parts by mass), to prepare an oil phase.

—Emulsification—

The prepared oil phase was fed into the aqueous phase prepared before, and mixed and emulsified using a homogenizer (10,000 rpm/5 minutes: T-50, obtained from IKA Japan K.K.), to obtain an emulsified liquid —Polymerization—

The prepared emulsified liquid was polymerized at 80 degrees C. for 6 hours while being stirred at 200 rpm. After the reaction ended, the polymerization reaction liquid was allowed to cool to room temperature (25 degrees C.). Polymerized resin particles produced were filtrated off by filtration, washed by filtration with distilled water, and dried naturally at room temperature (25 degrees C.), to obtain a lumpy curing agent. The lumpy curing agent was pulverized to primary particles using a pulverizer (A-O JET MILL, obtained from Seishin Enterprise Co., Ltd.), to obtain a particulate curing agent.

—Coating Process—

The coating film forming composition 1 of Preparation example 1 (100 parts by mass) was blended with the particulate curing agent (5 parts by mass). Subsequently, the resultant was heated and stirred at 30 degrees C. for 20 hours at the atmospheric pressure at 200 rpm. Subsequently, to the resultant, cyclohexane in three times as large an amount as the coating film forming composition was added. The resultant was irradiated with ultrasonic waves for 10 minutes, and then washed by filtration to collect solid matters. Subsequently, the solid matters were dried naturally, to obtain white solid catalyst particles. After drying, the white solid catalyst particles were pulverized to primary particles with AO-JET MILL (obtained from Seishin Enterprise Co., Ltd.), to obtain a latent curing agent 1.

Figure 11:
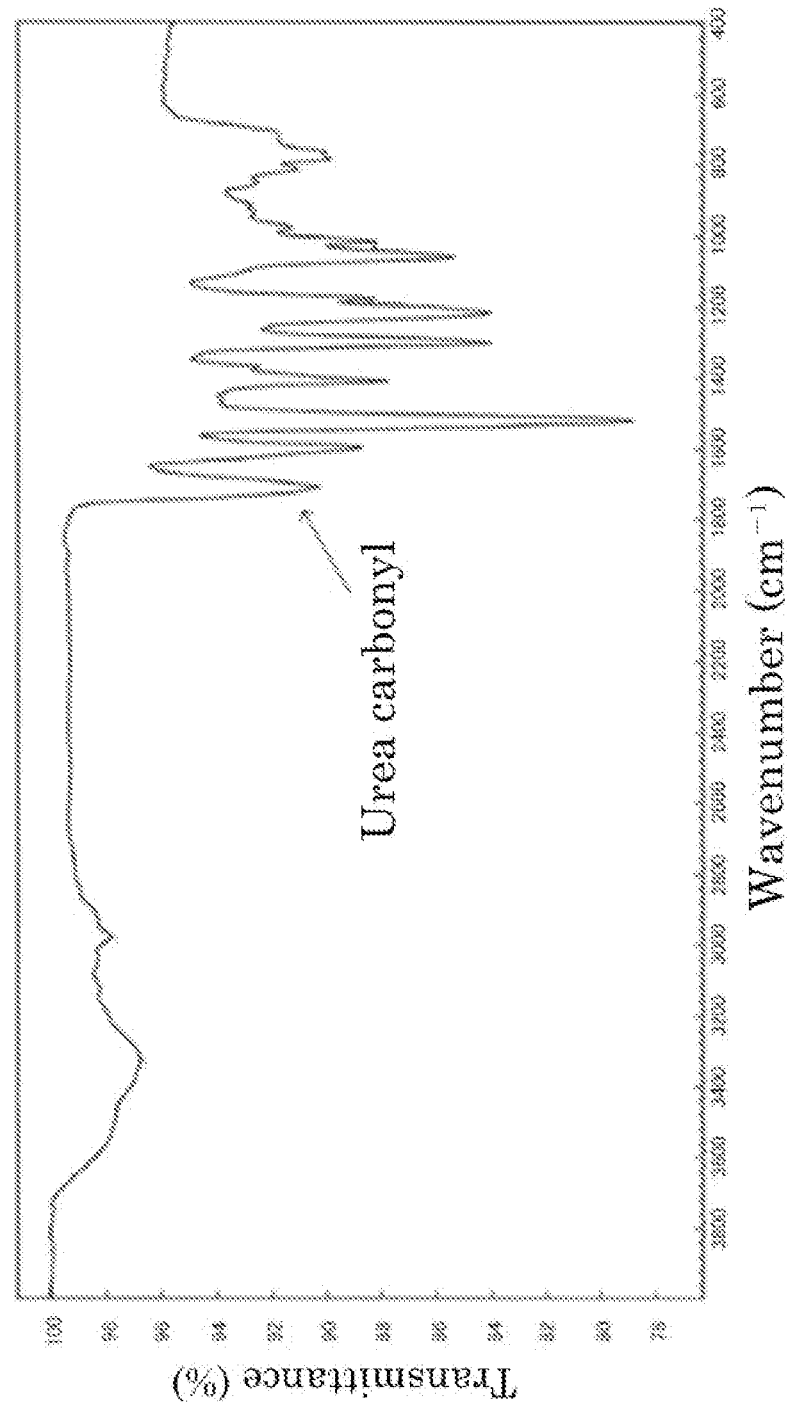
FIG. 11 is a chart indicating the result of an IR analysis of a latent curing agent of Example 1.

As indicated in FIG. 11, the obtained latent curing agent of Example 1 had a peak at a wavenumber of from 1,710 $cm^{-1}$ through 1,730 $cm^{-1}$ in an infrared absorption (IR) analysis. Hence, it was successfully confirmed that a polymer containing a urea bond was present in the coating film.

The IR analysis was performed using FTS-165 (obtained from Bio-Rad Laboratories, Inc.).

Comparative Example 1

A latent curing agent 2 formed of porous particles uncoated was obtained in the same manner as in Example 1 except that unlike in Example 1, the coating process was not performed.

Comparative Example 2

A latent curing agent 3 formed of a particulate curing agent to which an aluminum chelate compound was additionally filled was obtained in the same manner as in Example 1 except that unlike in Example 1, instead of the coating process, a process for additionally filling an aluminum chelate compound was performed in the manner described below using a coating film forming composition in which no isocyanate compound was blended.

—Additionally Filling Process—

The particulate curing agent (15 parts by mass) was fed into an aluminum chelate-based solution [a solution obtained by dissolving an aluminum chelate agent (ALU-MICHLATE D, obtained from Kawaken Fine Chemicals Co., Ltd.) (12.5 parts by mass) and another aluminum chelate agent (ALCH-TR, aluminum tris(ethyl acetoacetate), obtained from Kawaken Fine Chemicals, Co., Ltd.) (25 parts by mass) in ethyl acetate (62.5 parts by mass)], and stirred at 30 degrees C. for 20 hours at a stirring speed of 200 rpm. After stirring was completed, the resultant was filtrated and washed with cyclohexane, to obtain a lumpy curing agent. The lumpy curing agent was subjected to vacuum drying at 30 degrees C. for 4 hours, and subsequently pulverized to primary particles using a pulverizer (A-O JET MILL, obtained from Seishin Enterprise Co., Ltd.).

Comparative Example 3

A latent curing agent 4 formed of porous particles surface-treated with a silane coupling agent was obtained in the same manner as in Example 1 except that unlike in Example 1, instead of the coating process, surface treatment with a silane coupling agent described below was performed.

—Surface Treatment with Silane Coupling Agent—

A silane coupling agent treatment liquid was prepared by dissolving methyl trimethoxysilane (KBM-13, obtained from Shin-Etsu Chemical Co., Ltd.) (1.5 parts by mass) in cyclohexane (28.5 parts by mass). The particulate curing agent (3 parts by mass) was fed into this treatment liquid (30 parts by mass), and the obtained mixture was stirred at 30 degrees C. for 20 hours at 200 rpm to perform surface treatment with the silane coupling agent. After the treatment reaction ended, the polymerized particles were filtrated off from the treatment liquid by filtration, and dried naturally.

<DSC Measurement>

Next, DSC measurement of the latent curing agents of Example 1 and Comparative Examples 1 to 3 was performed in the manner described below. The results are presented in Table 2 and FIG. 1.

—Composition for DSC Measurement—

A composition prepared at a mass ratio of EP828:triphenyl silanol:latent curing agent=80:8:4 was used as a sample for DSC measurement.

EP828 (a bisphenol A-type epoxy resin, obtained from Mitsubishi Chemical Corporation)

Triphenyl silanol (obtained from Tokyo Chemical Industry Co., Ltd.)

Latent curing agent: the latent curing agent of Example 1, Comparative Example 1, Comparative Example 2, or Comparative Example 3

—DSC Measurement Conditions—

Measuring instrument: DSC6200 (obtained from Hitachi High-Tech Science Corporation)

Amount for evaluation: 5 mg

Temperature elevation rate: 10 degrees C./min

TABLE 2

| Latent curing agent | | Exothermic onset temperature (degree C.) | Exothermic peak temperature (degree C.) | Total exothermic amount (J/g) |
| --- | --- | --- | --- | --- |
| Comp. Ex. 1 | uncoated | 88.1 | 112.4 | −345 |
| Comp. Ex. 2 | product additionally filled with aluminum chelate compound | 81.7 | 105.9 | −372 |
| Comp. Ex. 3 | product surface treated with silane coupling agent | 99.1 | 117.6 | −338 |
| Ex. 1 | coated product | 69.7 | 100.1 | −374 |

From the results of FIG. 1 and Table 2, it is seen that when compared with Comparative Example 1, Example 1 achieved an exothermic onset temperature lower by about 18 degrees C. and an exothermic peak temperature lower by about 12 degrees C., and achieved a total exothermic amount higher by about 30 J. From this result, it was revealed that coating of the porous particles with the coating film forming composition significantly improved the low-temperature curing activity.

Comparative Example 2 was a product additionally filled with existing aluminum chelate compounds because the coating film forming composition was free of an isocyanate compound. When compared with this Comparative Example 2, Example 1 was found to have a better low-temperature curing activity.

Comparative Example 3 was a product surface-treated with a silane coupling agent instead of being coated. When compared with Comparative Example 1, which was uncoated, Comparative Example 3 achieved an exothermic onset temperature higher by about 11 degrees C. and an exothermic peak temperature higher by about 5 degrees C.

<SEM (Scanning Electron Microscope) Observation>

Figure 2:
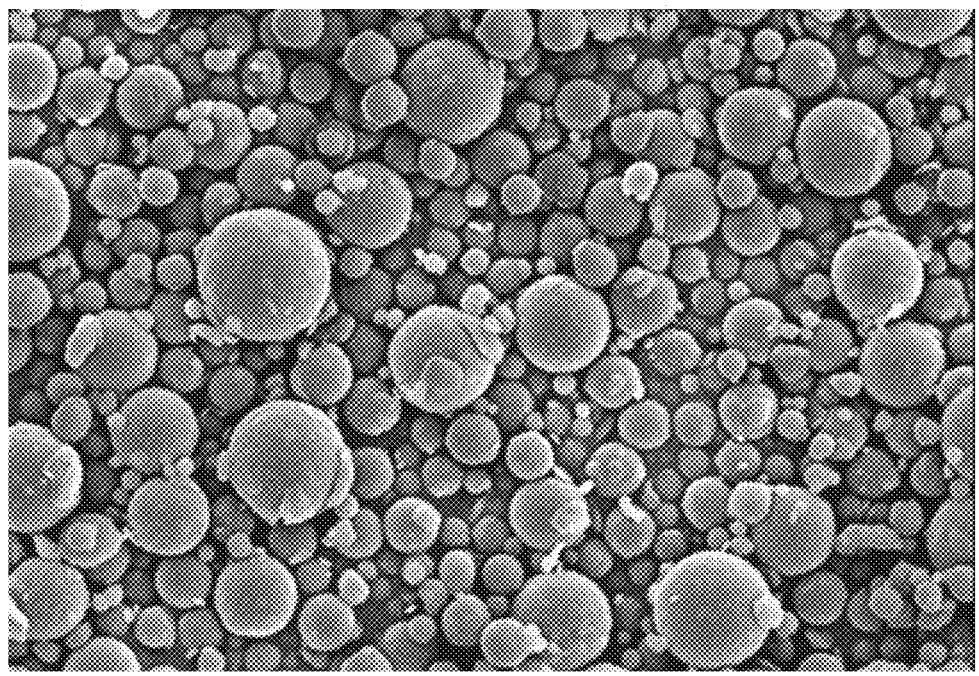
FIG. 2 is a SEM image (at a magnification of ×5,000) of a latent curing agent of Comparative Example 1.
Figure 3:
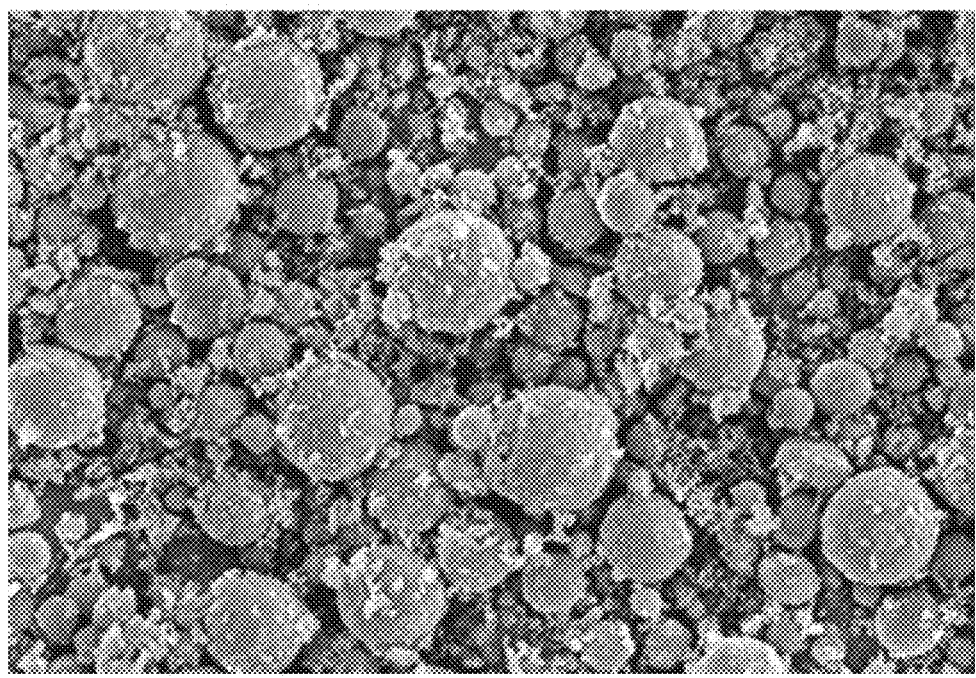
FIG. 3 is a SEM image (at a magnification of ×5,000) of a latent curing agent of Example 1.
Figure 4:
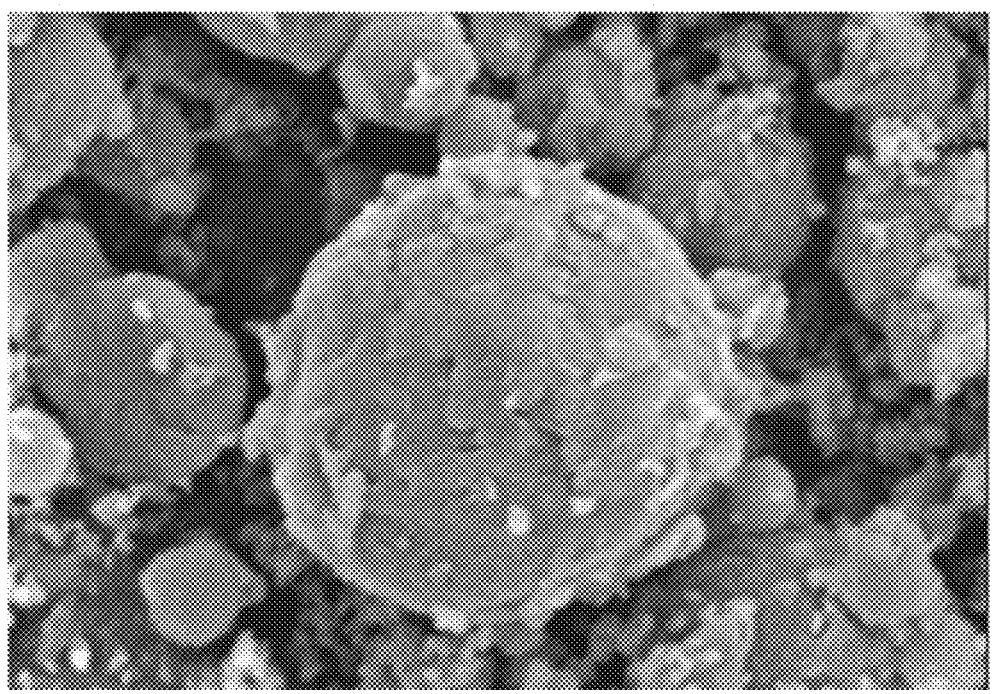
FIG. 4 is a SEM image (at a magnification of ×15,000) of a latent curing agent of Example 1.

Next, SEM images of the latent curing agents of Example 1 and Comparative Example 1 captured with JSM-6510A (obtained from JEOL Ltd.) are presented. FIG. 2 is a SEM image of Comparative Example 1 at a magnification of ×5.000. FIG. 3 is a SEM image of Example 1 at a magnification of ×5,000. FIG. 4 is a SEM image of Example 1 at a magnification of ×15,000.

From the SEM images of FIG. 2 to FIG. 4, it is seen that through the coating process using the coating film forming composition containing an isocyanate compound and aluminum chelate compounds, a coating film was formed over the surface of the obtained latent curing agent of Example 1.

<TG Measurement>

Next, TG of the latent curing agents of Example 1 and Comparative Example 1 was measured under the TG measuring conditions described below.

Figure 5:
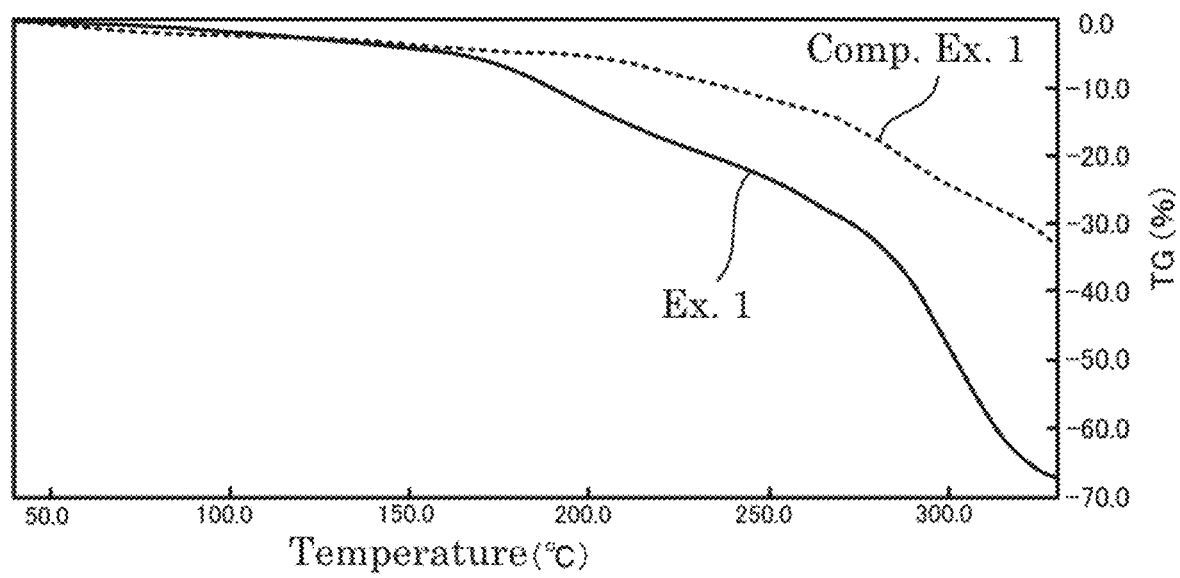
FIG. 5 is a chart indicating the result of TG measurement of latent curing agents of Example land Comparative Example 1

The results are presented in Table 3 and FIG. 5.

—TG Measuring Conditions—

Measuring instrument: TG/DTA6200 (obtained from Hitachi High-Tech Science Corporation)

Amount for evaluation: 5 mg

Temperature elevation rate: 10 degrees C./min

Evaluation range: weight reduction achieved up until 260 degrees C. was evaluated (because at 260 degrees C. or higher, thermal decomposition of the polymerized capsule walls would be promoted)

TABLE 3

| Latent curing agent | | TG* (%) |
|---|---|---|
| Comp. Ex. 1 | uncoated | −12.86 |
| Ex. 1 | coated product | −25.90 |

*Weight reduction ratio at 260 degrees C.

From the results of Table 3 and FIG. 5, it is seen that with coating of the porous particles supporting the aluminum chelate compound with the coating film forming composition containing the isocyanate compound and the aluminum chelate compounds, Example 1 achieved a weight reduction amount higher than Comparative Example 1 by about 13% due to heating. This was considered attributable to the success in formation of a polymeric coating film containing a highly active aluminum chelate compound through the coating process.

<One-Pack Storage Stability>

Next, the one-pack storage stability of the latent curing agents of Example 1, Comparative Example 1, Comparative Example 2, and Comparative Example 3 was evaluated in the manner described below. The results are presented in Table 4. The result of Example 1 is presented in FIG. 6.

—Composition for Storage Stability Measurement—

A composition prepared at a mass ratio of EP828:triphenyl silanol:curing agent=80:8:4 was used as the sample for measurement of storage stability.

EP828 (a bisphenol A-type epoxy resin, obtained from Mitsubishi Chemical Corporation)

Triphenyl silanol (obtained from Tokyo Chemical Industry Co., Ltd.)

Curing agent: the latent curing agent of Example 1, Comparative Example 1, Comparative Example 2, or Comparative Example 3

—Conditions of Storage Stability—

Storage temperature: 30 degrees C.

Storage period: 7 days

Evaluation: The changes in the total exothermic amount between before and after storage were compared by DSC measurement. The DSC measurement was as the same as described above.

TABLE 4

| | Storage process | Exothermic onset temperature (degree C.) | Exothermic peak temperature (degree C.) | Total exothermic amount (J/g) |
|---|---|---|---|---|
| Ex. 1 | Absent | 69.7 | 100.1 | −374 |
| | 30 degrees C., 7 days | 69.3 | 100.5 | −375 |
| Comp. Ex. 1 | 30 degrees C., 7 days | 91.4 | 115.6 | −331 |
| Comp. Ex. 2 | 30 degrees C., 7 days | 89.1 | 113.2 | −345 |
| Comp. Ex. 3 | 30 degrees C., 7 days | 101.4 | 119.1 | −323 |

Figure 6:
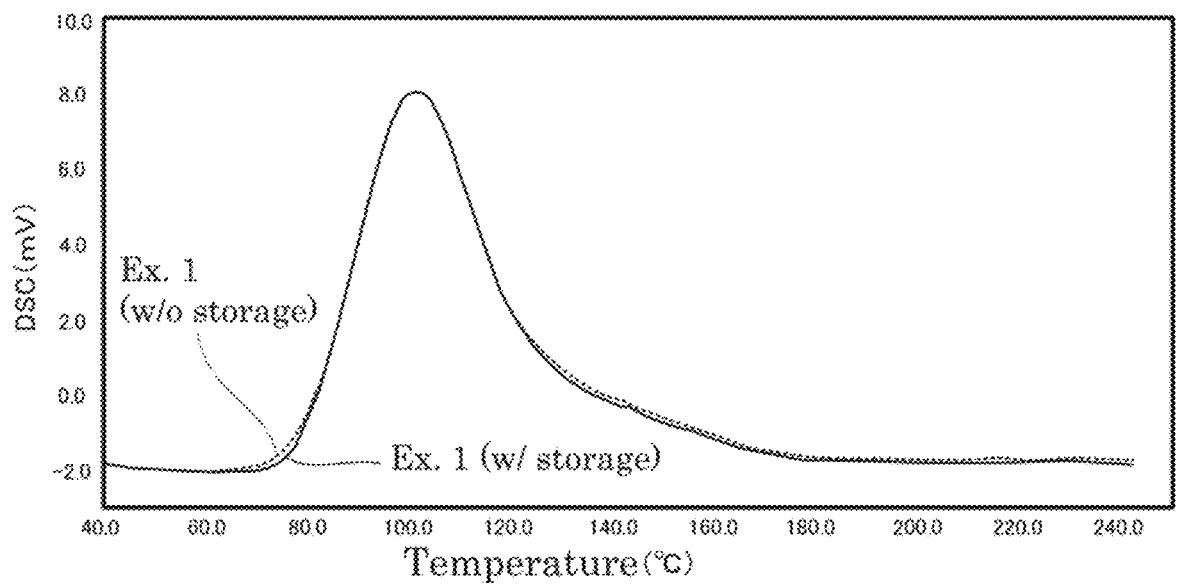
FIG. 6 is a chart indicating the result of DSC measurement of one-pack storage stability of Example 1 before and after storage.

From the results of Table 4 and FIG. 6, it was revealed that the latent curing agent of Example 1 was highly excellent in the one-pack storage stability of the epoxy resin composition although it had an excellent low-temperature curing ability. Note that the slight differences between presence of storage process and absence of storage process in Example 1 were considered measurement errors. From this fact, it was found possible to sufficiently wash and remove any aluminum chelate compounds that may be considered having been remaining over the polymeric coating film over the surfaces of the porous particles, by ultrasonic treatment in the washing solvent (cyclohexane) and the filtration washing and collecting process.

As compared, all of Comparative Examples 1 to 3 were found to have a poorer one-pack storage stability than Example 1.

<Aluminum (Al) Mapping in Cross-Section of Latent Curing Agent>

Next, for the latent curing agents of Example 1 and Comparative Example 1, Al mapping in a cross-section of the latent curing agent particle was performed with a focused ion beam (FIB-SEM). The results are presented in FIG. 7A to FIG. 8B.

Figure 7A:
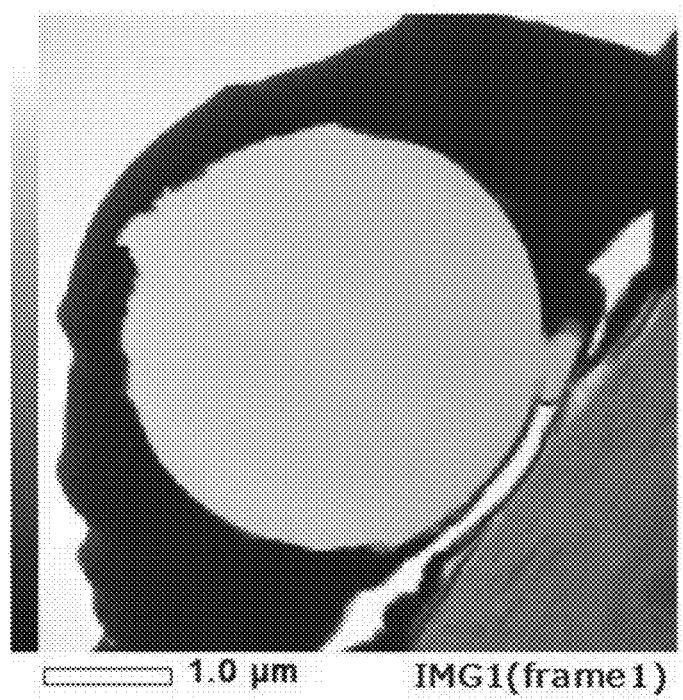
FIG. 7A is a cross-sectional SEM image of a latent curing agent particle of Comparative Example 1.
Figure 7B:
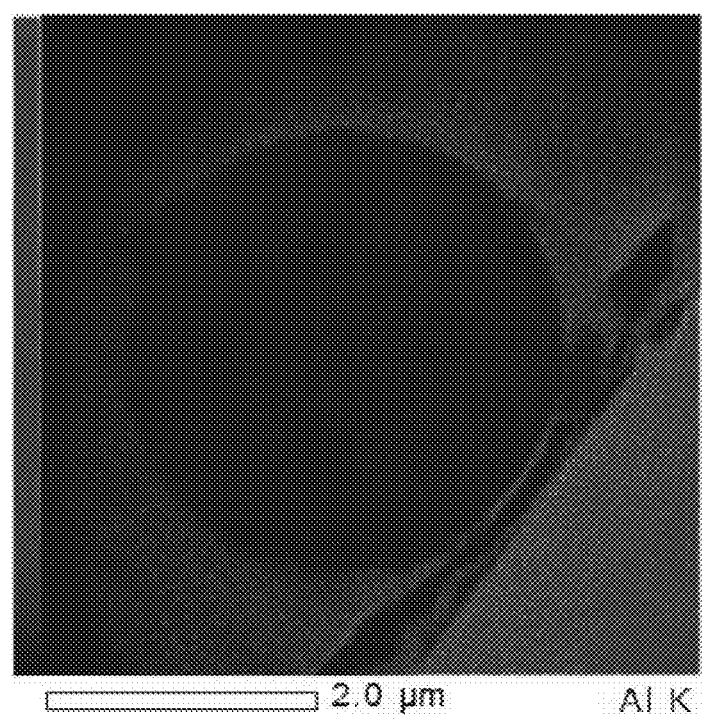
FIG. 7B is a diagram representing Al mapping on a latent curing agent particle of Comparative Example 1 by FIB-SEM.

As regards Comparative Example 1, the aluminum chelate compound was spread all over the latent curing agent particle as illustrated in FIG. 7A and FIG. 7B, but was hard to identify because the amount of aluminum was small.

Figure 8A:
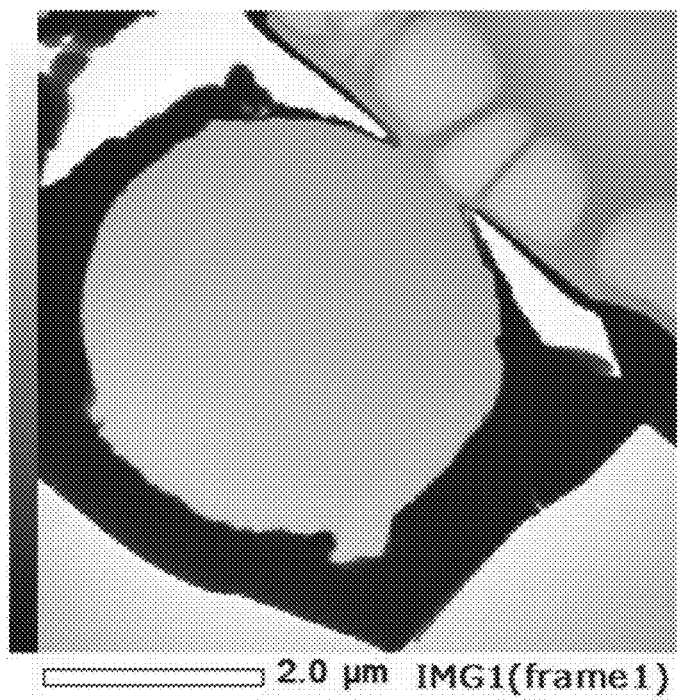
FIG. 8A is a cross-sectional SEM image of a latent curing agent particle of Example 1.
Figure 8B:
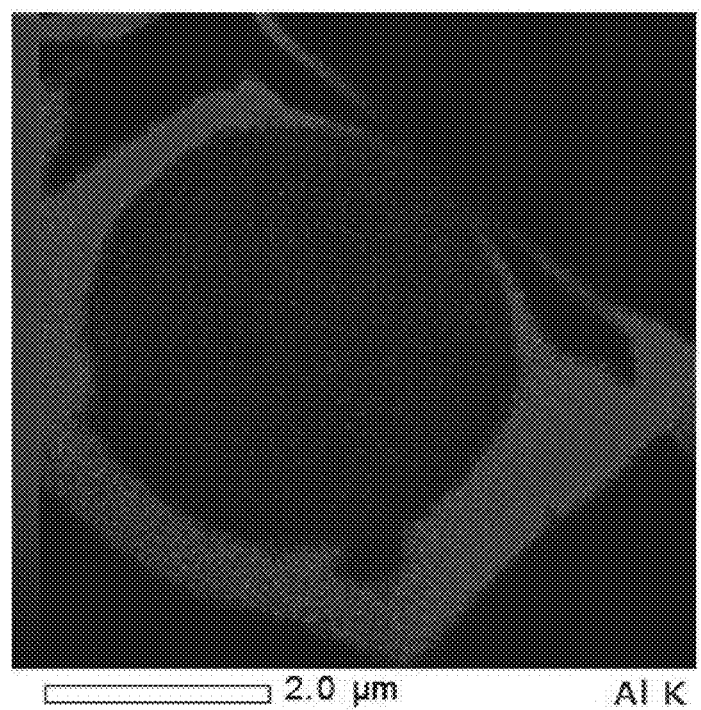
FIG. 8B is a diagram representing Al mapping on a latent curing agent particle of Example 1 by FIB-SEM.

As regards Example 1, the aluminum chelate compound was distributed uniformly all over the latent curing agent particle as illustrated in FIG. 8A and FIG. 8B. Further, as compared with uncoated Comparative Example 1, Example 1 had a clearer contrast. Therefore, it is estimated that the amount of the aluminum chelate compound included was large in Example 1.

<Surface Element Analysis by ESCA>

Next, the latent curing agents of Example 1 and Comparative Example 1 were analyzed by ESCA (Electron Spectroscopy for Chemical Analysis). The results are presented in Table 5, Table 6, FIG. 9, and FIG. 10.

—ESCA Measuring Conditions—

AXIS-HS (obtained from Kratos Analytical Inc.) was used as the measuring instrument. MgKα was used as an X-ray source, and a current value of 10 mA, an accelerating voltage value of 10.4 kV; and a scanning speed of 1 eV were used as the measuring conditions.

TABLE 5

| | | Atomic concentration (%) | | | |
|---|---|---|---|---|---|
| | n | C | N | O | Al |
| Comp. Ex. 1 | n1 | 65.94 | 3.56 | 27.57 | 2.92 |
| | n2 | 66.44 | 4.49 | 26.31 | 2.76 |
| | Average | 66.19 | 4.03 | 26.94 | 2.84 |

TABLE 6

| | | Atomic concentration (%) | | | |
|---|---|---|---|---|---|
| | n | C | N | O | Al |
| Ex. 1 | n1 | 70.56 | 6.33 | 20.55 | 2.57 |
| | n2 | 70.05 | 7.07 | 20.47 | 2.42 |
| | Average | 70.31 | 6.70 | 20.51 | 2.50 |

Figure 9:
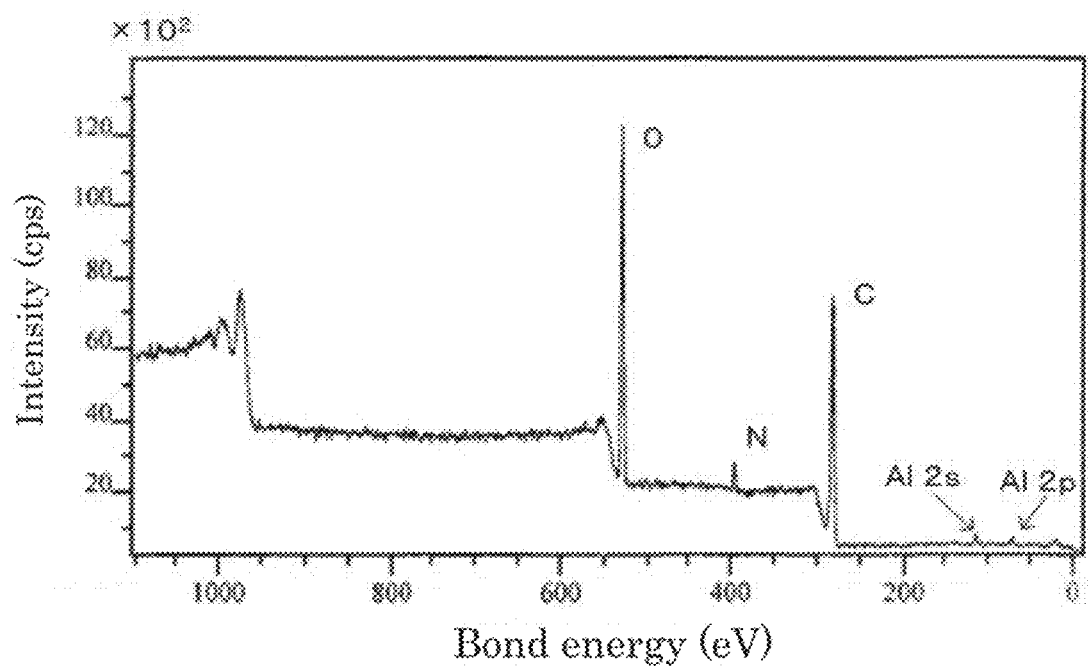
FIG. 9 is a chart indicating the result of an ESCA analysis of a latent curing agent of Comparative Example 1.
Figure 10:
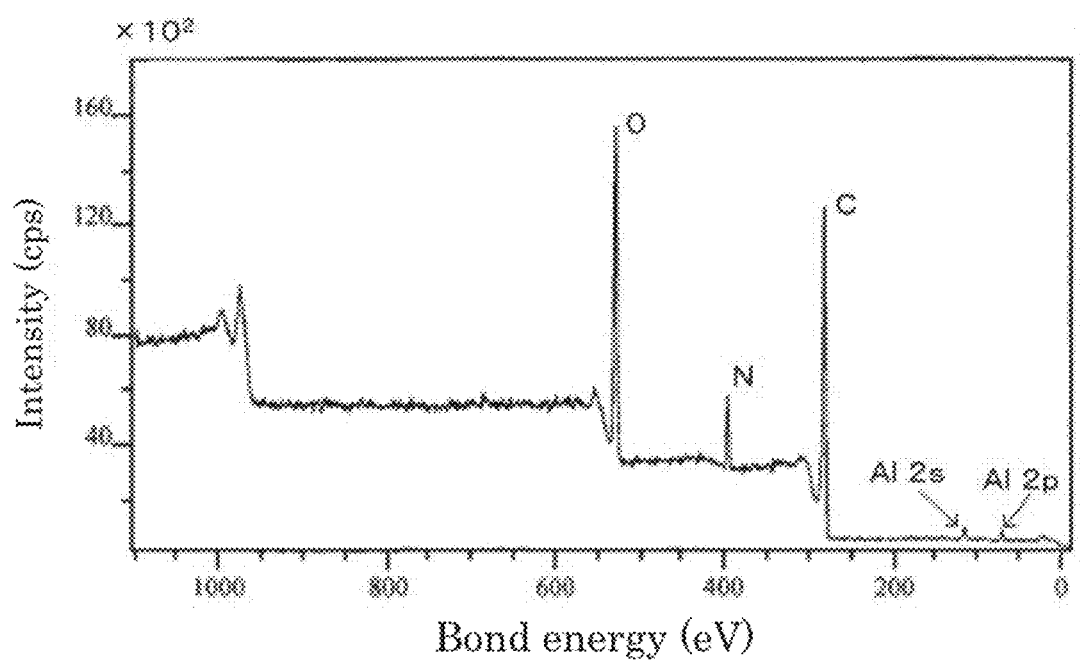
FIG. 10 is a chart indicating the result of an ESCA analysis of a latent curing agent of Example 1.

From the results of Table 5, Table 6, FIG. 9, and FIG. 10, it was revealed that coated Example 1 had a similar aluminum (Al) percentage, but a higher nitrogen (N) percentage and a lower oxygen (O) percentage in the surface of the latent curing agent particle as compared with uncoated Comparative Example 1, and that the both had clearly different surface element compositions. From the results of Table 6, it was confirmed that the coating film of Example 1 contained the nitrogen element by 5 atm % or greater and the oxygen element by 25 atm % or less.

Because uncoated Comparative Example 1 was polymerized in water, it was considered that the isocyanate compound was eluted into water to decrease the nitrogen percentage. Because Example 1 had an excellent low-temperature curing activity although it had a similar aluminum (Al) percentage to Comparative Example 1, it was suggested that Example 1 contained the aluminum chelate compounds in a highly active state in the coating film.

<Quantitative Determination of Aluminum Chelate Compounds in Latent Curing Agent Particle by LC/MS>

Next, the latent curing agents of Example 1 and Comparative Example 1 were analyzed by LC/MS (Liquid Chromatography Mass Spectrometry). The results are presented in Table 7 and Table 8.

—LC/MS Measuring Conditions—

ACQUITY UPLC/SQD (obtained from Waters Corporation) was used as the measuring instrument. The measurement was performed using a water-acetonitrile mixture solvent at a flow rate of 0.4 ml/min. The determined quantity was derived by conversion of the intensity of the molecular ion peaks of the aluminum chelate compounds to aluminum chelate compound contents by a calibration curve measured separately.

TABLE 7

| | n | Determined quantity of aluminum chelate compounds (% by mass) | |
|---|---|---|---|
| | | ALUMICHLATE D | ALCH-TR |
| Comp. Ex. 1 | n1 | 3.0 | 0.2 |
| | n2 | 2.0 | 0.2 |
| | Average | 2.5 | 0.2 |

TABLE 8

| | n | Determined quantity of aluminum chelate compounds (% by mass) | |
|---|---|---|---|
| | | ALUMICHLATE D | ALCH-TR |
| Ex. 1 | n1 | 22.0 | 6.0 |
| | n2 | 22.0 | 6.2 |
| | Average | 22.0 | 6.1 |

From the results of Table 7 and Table 8, it is seen that the coated latent curing agent particle of Example 1 exhibited a high total aluminum chelate compound content of 28.1% by mass as compared with uncoated Comparative Example 1. In Example 1, the aluminum chelate compound in the curing agent particle was not hydrolyzed through the coating process but maintained the initial structure. That is, it was revealed that Example 1 contained the aluminum chelate compound in a highly active state in a large amount. From the results of Table 8, it was confirmed that the latent curing agent of Example 1 contained a highly active aluminum chelate compound by 20% by mass or greater.

Because uncoated Comparative Example 1 was polymerized in water, it is could be considered that the percentage at which the aluminum chelate compound in the latent curing agent particle failed to maintain the initial structure due to hydrolyzation in water was high.

As described above, it was revealed that the latent curing agent obtained by coating the surfaces of the porous particles containing the aluminum chelate compound with the coating film forming composition in which highly active aluminum chelate compounds and an isocyanate compound were dissolved enabled curing at a lower temperature than by existing techniques, and that an epoxy resin composition having a significantly improved one-pack storage stability could be obtained by blending of the latent curing agent.

The invention claimed is:

1. A latent curing agent, comprising:
   porous particles supporting an aluminum chelate compound; and
   a coating film over surfaces of the porous particles, the coating film containing an aluminum chelate compound and a polymer that contains at least one of a urea bond and an urethane bond,
   wherein a content of an active aluminum chelate compound is 20% by mass or greater.

2. The latent curing agent according to claim 1,
   wherein the porous particles are formed of a poly urea resin.

3. The latent curing agent according to claim 1, wherein the coating film contains a nitrogen element by 5 atm % or greater.

4. The latent curing agent according to claim 1,
   wherein the coating film contains an oxygen atom by 25 atm % or less.

5. A method for producing a latent curing agent, the method comprising:
   heating and stirring a coating film forming composition and porous particles supporting an aluminum chelate compound in presence of a non-aqueous solvent,
   wherein the coating film forming composition comprises
   an isocyanate compound; and
   an aluminum chelate compound,
   wherein a content of the isocyanate compound is 10% by mass or less.

6. The method for producing a latent curing agent according to claim 5,
   wherein a content of the aluminum chelate compound is 5% by mass or greater but 50% by mass or less.

7. A canonically curable composition, comprising:
   a latent curing agent; and
   a canonically curable compound,
   wherein the latent curing agent comprises:
      porous particles supporting an aluminum chelate compound; and
      a coating film over surfaces of the porous particles, the coating film containing an aluminum chelate compound and a polymer that contains at least one of a urea bond and an urethane bond,
   wherein a content of an active aluminum chelate compound in the latent curing agent is 20% by mass or greater.

8. The canonically curable composition according to claim 7,
   wherein the cationically curable compound is air epoxy compound or an oxetane compound.

9. The canonically curable composition according to claim 7, further comprising:
   an aryl silanol compound.

* * * * *